United States Patent [19]

Mason et al.

[11] Patent Number: 5,643,350
[45] Date of Patent: Jul. 1, 1997

[54] WASTE VITRIFICATION MELTER

[75] Inventors: J. Bradley Mason, Pasco; Mark Alan Hall, Richland, both of Wash.

[73] Assignee: VECTRA Technologies, Inc., Columbia, S.C.

[21] Appl. No.: 335,643

[22] Filed: Nov. 8, 1994

[51] Int. Cl.⁶ .................... C03B 5/44; C03B 5/167
[52] U.S. Cl. .................. 65/158; 65/327; 65/347; 65/356; 588/201; 588/900
[58] Field of Search ............... 65/29, 12, 158, 65/325, 326, 327, 329, 347, 356; 373/36, 37, 38; 588/201, 900

[56] References Cited

U.S. PATENT DOCUMENTS

| | | | |
|---|---|---|---|
| 469,454 | 2/1892 | Rogers | 65/327 |
| 1,063,483 | 6/1913 | Weintraub | 373/72 |
| 1,394,677 | 10/1921 | Hutton | 65/327 |
| 1,438,936 | 12/1922 | Eimer | 373/3 |
| 1,956,171 | 4/1934 | Hitner | 65/327 |
| 2,141,425 | 12/1938 | Wadsworth | 65/326 |
| 2,186,718 | 1/1940 | Ferguson | 65/327 |
| 2,789,152 | 4/1957 | Ham et al. | 373/93 |
| 2,958,719 | 11/1960 | Beecher | 373/93 |
| 3,085,408 | 4/1963 | Arbeit | 65/179 |
| 3,266,881 | 8/1966 | Novack et al. | 65/326 |
| 3,580,976 | 5/1971 | De Bussy | 65/326 X |
| 3,669,435 | 6/1972 | Silverberg | 65/179 X |
| 3,735,010 | 5/1973 | Turpin | 13/35 |
| 4,065,634 | 12/1977 | Beizerov et al. | 13/10 |
| 4,460,398 | 7/1984 | Sasaki | 65/327 |
| 4,471,488 | 9/1984 | Reboux | 373/153 |
| 4,475,206 | 10/1984 | Dietze et al. | 373/79 |
| 4,600,425 | 7/1986 | Krumwiede et al. | 65/178 |
| 4,627,069 | 12/1986 | Harvey et al. | 373/29 |
| 4,923,508 | 5/1990 | Diehm et al. | 75/10.14 |
| 4,965,812 | 10/1990 | Sorg et al. | 373/36 |
| 4,983,198 | 1/1991 | Ogino | 65/32.5 |
| 5,028,248 | 7/1991 | Williams et al. | 65/136 |
| 5,040,773 | 8/1991 | Hackman | 266/84 |
| 5,060,914 | 10/1991 | Wang et al. | 266/236 |
| 5,100,453 | 3/1992 | Richards | 65/27 |
| 5,120,342 | 6/1992 | Richards | 65/178 |
| 5,120,352 | 6/1992 | Jackson et al. | 75/346 |
| 5,149,488 | 9/1992 | Dickson | 266/242 |
| 5,188,649 | 2/1993 | Macedo et al. | 65/21.3 |
| 5,188,794 | 2/1993 | Daussan et al. | 266/44 |
| 5,304,701 | 4/1994 | Igarashi | 588/201 |

*Primary Examiner*—Donald E. Czaja
*Assistant Examiner*—Sean Vincent
*Attorney, Agent, or Firm*—Michael A. Mann, P.A.

[57] ABSTRACT

A glass melter for vitrifying material including radioactive and hazardous materials. In one embodiment, the melter comprises an inner vessel or container having a solidified glass skull, at least one pair of vertically-oriented, retractable electrodes, a first wall spaced apart from said inner vessel to define a dry annulus therebetween for radiatively cooling the inner vessel, and a second wall spaced apart from said first wall to define a second annulus that serves as a water jacket when filled with water. Each electrode has a protective sleeve therearound with means formed therebetween for passing a purging gas therethrough. A central access nozzle allows waste material and glass formers to be fed into the inner vessel while simultaneously venting the off-gas generated in the inner vessel. Also, the dry annulus can have fluid circulating therethrough for regulated cooling or leak detection. An alternative embodiment contains a top entry glass tap, allowing the removal of vitrifiable material without penetrating the skull of the melter. Another embodiment provides a retractable oxygen lance which provides oxygen control to both the atmosphere above the batch and the batch itself, and a dual melt zone drain assembly which can provide enough energy from cold startup to activate the electrodes. The drain assembly also has a separately heated nozzle which, when deenergized, prevents material from exiting the melter. The melter includes, in the preferred embodiment, a bottom electrode that can provide direct heat input at the drain orifice.

22 Claims, 5 Drawing Sheets

_FIG_5B_

WASTE VITRIFICATION MELTER

BACKGROUND OF THE INVENTION

1. Field of the Invention:

The present invention relates to glass melters for vitrification of wastes. More particularly, the present invention relates to the design of a melter for stabilization of radioactive and hazardous wastes by encapsulation of the waste in glass.

2. Discussion of Background:

Melters and furnaces have been in existence for many years to manufacture metals and glass and to vitrify waste. Early glass melters included inner walls lined with refractory to insulate the vessel from its molten contents. A refractory is an earthy, ceramic material of low thermal and electrical conductivity capable of withstanding extremely high temperatures.

Early glass melters used direct heat from gas or other combustible fuel burned in the upper portion of the melter (the plenum) directly above the pool of molten material. Later, electric melters were developed that used electrical resistance heat applied to the outside melter wall to heat the glass indirectly or applied directly to the glass by one or more electrode pairs. Direct heating is commonly referred to as Joule heating or Joule-effect heating. Initially, the electrodes were positioned above the melt line of the molten material and heat from the electrode electric arcs or plasma arc torches was absorbed by the molten material.

In other electric melter designs, the electrodes are mounted to the floor or the sides of the melter interior so that the electrodes are submerged in the body of molten material. Alternatively, the electrodes extend vertically into the molten material from the top of the melter or horizontally into the molten material through the melter outside wall and refractory.

Many melter design developments have occurred over the years, including the use of various materials to replace refractories, which are relatively expensive. Even soils and other bulky materials that are naturally insulative are being used to replace refractories in melters. Such materials make the melters too large and heavy for many vitrification applications. Also, electrical current can short circuit from the electrodes through the refractory when the conductivity of the melter contents decreases relative to the conductivity of the refractory or through molten high metal contents that accumulate on the bottom floor of waste glass melters. Also, refractories need to be repaired or replaced periodically, thus increasing expense and downtime. Also, if the melter is radioactive, its repair and maintenance necessitates high personnel exposure and, for extremely contaminated melters, may not be economically feasible.

In the process known as "skull" melting, a layer of non-conducting material, usually of the same type as that being melted, is allowed to form a shell or "skull" on the inside wall of the melter. For metal melting, the skulls are typically made from refractory oxides such as $Y_2O_3$, $ZrO_2$, $La_2O_3$, as well as mixed oxides such as $LaAlO_3$, $CaZrO_3$.

Glass skulls in glass making am also known. U.S. Pat. No. 5,149,488 describes a method and apparatus for rapidly solidifying a material using a "skull" within a pool of molten material. The skull is of the same material as the material to be solidified, thereby avoiding compositional fluctuations or dissolution of refractory into the molten pool. U.S. Pat. No. 5,028,248 also discloses a skull employed in combination with a rotatable shell. The rotatable shell distributes the heat throughout the molten material and provides for an even melt.

However, prior to the instant invention, there existed no vitrification melter design that provides adequate insulation for the melter vessel without the use of a refractory, while being compact, reliable and requiring little maintenance.

SUMMARY OF THE INVENTION

According to its major aspects and broadly stated, the present invention is a glass melter for vitrifying radioactive or other hazardous wastes. In particular, it is an electric, joule-heated glass melter that comprises an inner vessel or container having a solidified glass skull, at least one vertically or horizontally oriented, retractable electrode, a second container surrounding the inner one and spaced apart therefrom so as to form an annulus for radiative cooling, and a third container surrounding the second one and spaced apart therefrom so as to enable a water jacket to exist therebetween for additional cooling. Each electrode may have a protective sleeve therearound with means formed therebetween for circulating a purging gas therethrough, and providing an electrical insulator between the sleeve and electrode. In one embodiment, a central access nozzle allows waste material and glass formers to be fed into the inner vessel while simultaneously venting the off-gas generated in the inner vessel. Also, the annulus can have fluid circulating therethrough for regulated cooling or for detecting leaks in the inner vessel. In another embodiment, the melter has a retractable oxygen lance that can provide oxygen control to the batch and the melter atmosphere above the batch surface, and a dual melting zone bottom drain which can produce enough energy to cold start the melter. The dual melting zone bottom drain also contains a nozzle which prevents molten batch from accidentally exiting the melter. Another embodiment of the present invention includes a top entry glass tap which allows glass to be removed without penetrating the bottom or side of the melter.

A major feature in a preferred embodiment of the present invention is the three-walled construction of the melter and the double annulus formed therefrom. The double annulus includes an inner, dry annulus surrounding the inner vessel of the melter for radiative cooling and a second, water-cooled annulus surrounding the first annulus. Having an inner annulus that is dry and permits more rapid leak detection as well as dry containment of molten material in the event of a breach of the inner vessel is a significant advantage of the present design and is especially important in vitrification of radioactive wastes. The dry annulus prevents steam explosions that often occur in water lined melters when the skull is breached. Another advantage of the double annulus is that it provides a large capacity heat sink that helps maintain the temperature of the wall of the inner vessel within a safe, moderate range (preferably approximately 500°–600° C.) under all operating conditions. This minimizes sulfidation attack that can occur above 650° C. and acid gas corrosion that can occur below 250° C.

Yet another advantage of the triple-walled construction in processing radioactive wastes is that it provides additional integral shielding around the inner vessel. It also provides strong, structural containment that can withstand fatigue and seismic and structural stresses, as well as thermal creep.

Another feature of the water jacket formed between the outer third container and the middle container is that the water in the double annulus generates low pressure steam (approximately 15–25 psig during normal operation) that can be used in other areas of the vitrification process.

The use of retractable, vertical electrodes is another feature in a preferred embodiment of the present invention.

Preferably, at least one pair of electrodes enters from the top of the melter and extends through a sealed bore downward into the vitrifiable material contained within the inner vessel. The advantage of having vertical electrodes penetrating through the melter vessel from the top is that the potential loss of containment is minimized if not totally eliminated. This is different than the horizontal side entry or bottom entry electrodes that, upon failure, could allow molten glass (potentially radioactive) to drain from the floor of the melter. Moreover, the electrode spacing and depth of penetration can be adjusted to allow the control of voltage and amperage with a wide range of glass conductivities. Furthermore, the electrodes can be moved in all three dimensions, thereby achieving precise thermal conditions.

Yet another feature of the present invention is the insulative sleeve around each electrode. Preferably, each sleeve surrounds a corresponding electrode and has means for circulating a purging gas therebetween. Alternatively, each sleeve can be water-cooled. In addition, an insulative sleeve can be placed between the electrode and the outer protective sleeve. The advantage of the electrode sleeves is that they prevent gas phase corrosion on the electrodes and they prevent molten glass corrosion at the glass/gas interface. Also, the electrode sleeves prevent the electrodes from shorting out as the result of molten salt phase separation on top of the vitrifiable material within the inner vessel. Moreover, the sleeve can be retracted independent of the electrode to maintain sleeve—glass contact in the vent of glass level fluctuations.

The use of a purge gas is yet another feature of the present invention. The purge gas can provide glass surface level detection by operating as a gas buffer with differential pressure detection at the end of the outer sleeve.

Still another feature of the present invention is the glass skull, which preferably is solidified against the interior surface of the inner vessel to prevent shorting of the electrode. Also, the glass skull, because of its thermal insulative properties, reduces heat losses within the melter.

Another advantage of using the glass skull is that the composition of the glass and the wastes solidified in it can be changed without affecting the melter shell. The refractory of melters is carefully selected for resistance to specified glass formulations and temperatures; thus, only certain vitrifiable materials can be used with certain refractories. In the present invention, the use of the glass skull eliminates this concern because the composition of the skull can be adjusted easily.

Yet another advantage of the glass skull is the increased capacity for a given size melter. Preferably, the glass skull is approximately 6 to 8 inches thick compared with refractories that are approximately 10 to 18 inches thick in most applications. Thus, for a melter vessel of a given size, the use of the glass skull rather than a typical refractory increases the capacity of the melter vessel.

The use of a dual melting zone bottom drain is still another feature in a preferred embodiment of the present invention. The bottom drain is comprised of a melting zone and a nozzle depending therefrom. The melting zone has metal placed upon the floor interior and induction coils surrounding its exterior. When activated, these coils impart sufficient heat to melt the metal, which in turn melts the adjacent glass, or raises the metal to a temperature that is sufficient to melt the adjacent glass. The heat generated from the metal and transferred to the melting glass is sufficient to allow the Joule heated electrodes to conduct current. Thus, the drain assembly can startup the melter from cold condition. Moreover, the nozzle section contains induction coils that, when energized, allow the flow of material out of the nozzle. When these induction coils are deenergized, the material within the nozzle solidifies and closes the nozzle, thereby preventing material from exiting the melter.

The retractable, rotatable oxygen lance contained in a preferred embodiment is yet another feature of the present invention. The retractability of the lance enables it to control both the oxygen content of the batch and of the atmosphere existing above the batch, while the mixing blades homogenize the batch.

The top entry glass tap contained in a preferred embodiment is still another feature of the present invention. Removing the glass from the top of the melter eliminates a side or bottom penetration of the melter, which is otherwise necessary for installation of a discharge device. This in turn allows a uniform "skull" to be placed about the inner surface of the melting region, thereby reducing the probability of its melting down. Furthermore, the retractable glass tap can be removed for maintenance, without shutting down the entire melter.

Also, the bottom electrode is another feature of the present invention. The bottom electrode provides joule heat directly at the nozzle drain area to control flow by melting vitrifiable material or allowing it to solidify and close the drain.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

In the following description similar components are referred to by the same reference numeral in order to simplify and clarify the understanding of the drawings.

Figure 1:
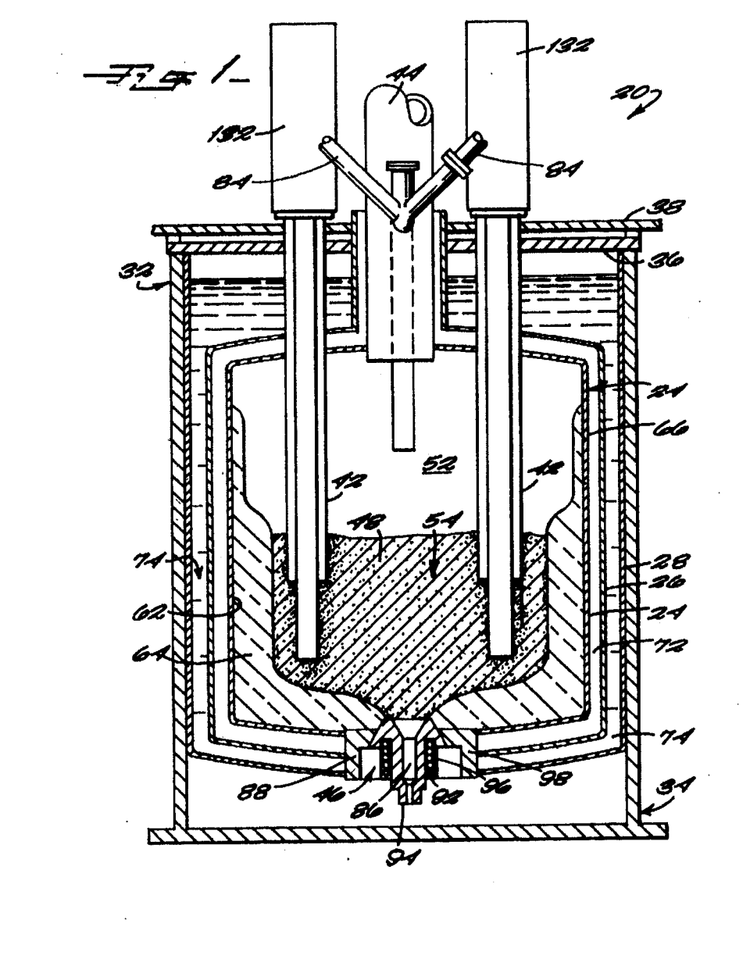
FIG. 1 is a partial, cross-sectional view of a melter according to a preferred embodiment of the present invention.

Referring now to FIG. 1, the melter 20 in its preferred embodiment is a double- or triple-walled, all-welded vessel assembly comprising an inner vessel 24, surrounded by a first outer wall 26 and then a second outer wall 28. Melter 20 has a top region 32 and a bottom region 34. Top region 32 has a top shield plate 36 and a floor shield plate 38, through which a pair of electrodes 42 and a central access nozzle 44 extend. Bottom region 34 has a replaceable, bottom pour valve (BPV) assembly 46 operably positioned therein and in fluid communication with the interior of melter 20.

Inner vessel 24 is configured to contain molten, vitrifiable material 48 (also referred to herein as the "molten glass product"). Inner vessel 24 has an upper, gas plenum region 52 and a lower, melting/thermal region 54. Inner vessel 24 is preferably fabricated of a high nickel-chrome alloy designed to resist thermal stress and corrosive gases and salts that can occur in gas plenum 52.

The interior wall 62 of inner vessel 24 is protected from vitrifiable material 48 by a thick, solidified layer or skull 64. Skull 64 is a layer of glass or a combination of glass, sintered glass formers or refractory materials, approximately 6 to 8 inches thick that is kept solidified against interior wall 62 of inner vessel 24 by cooling the exterior 66 of inner vessel 24 in a manner described below.

Preferably, first outer wall 26 is spaced apart from inner vessel 24 as shown to form a dry annulus 72 therebetween. Similarly, second outer wall 28 is configured as shown to form a second annulus 74 with first outer wall 26. Second annulus 74 is preferably filled with water, thus forming a water-cooled jacket around inner vessel 24 and dry annulus 72. The water-cooled jacket of second annulus 74 completely surrounds inner vessel 24, except for electrodes 42, central access nozzle 44 and BPV assembly 46. Also, other nozzles (not shown) may enter inner vessel 24 for instrumentation and the like. Both first outer wall 26 and second outer wall 28 are preferably made of stainless steel, although both can be made of other material suitable for operation.

In addition to using a water jacket in second annulus 74 to water cooling inner vessel 24, melter 20 uses dry annulus 72 to cool inner vessel 24 by radiation of heat toward first outer wall 26. Also, an inert gas or vacuum can be used within dry annulus 72 for higher or lower heat transfer efficiency of inner vessel 24 as desired. Moreover, the inert gas can be used to pressurize dry annulus 72 in a manner to detect leaks in the wall of the inner vessel 24. When vitrifying radioactive wastes, an inner vessel leak should be detected quickly in order to prevent contamination of related components.

Figure 2:
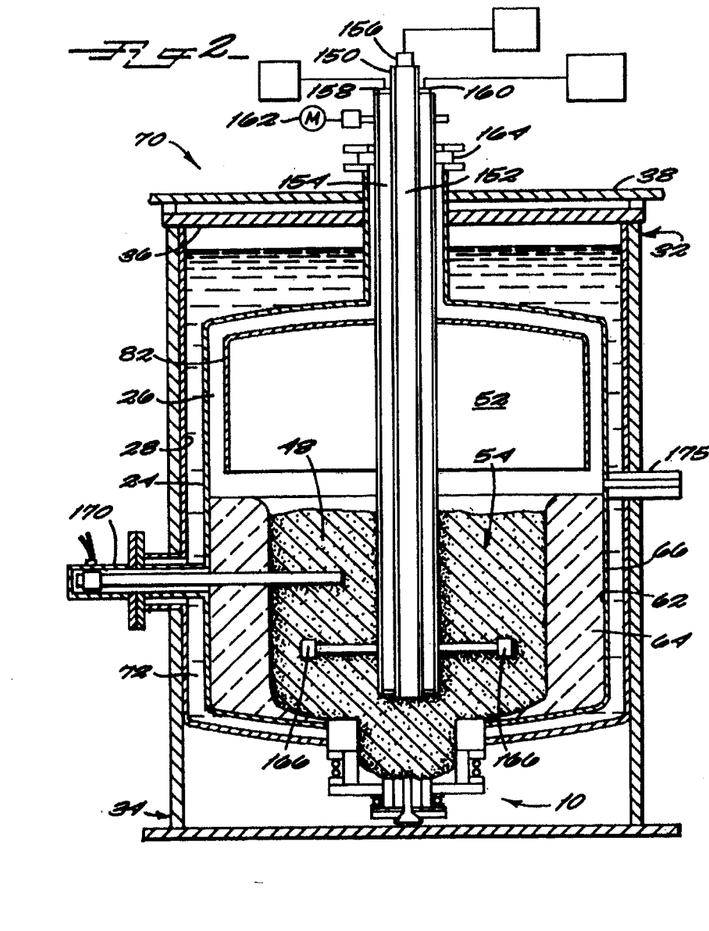
FIG. 2 is a partial, cross-sectional view of a melter according to an alternative embodiment of the present invention.

Additionally, as shown in FIG. 2, an inner radiative shield 82 can be used instead of first outer wall 26 to provide additional radiative cooling of inner vessel 24. Preferably, inner radiative shield 82 is mounted in gas plenum region 52, as shown.

The containment formed by first outer wall 26 and second outer wall 28 around inner vessel 24 serves many important functions. First, outer walls 26, 28 serve as secondary containment for inner vessel 24 in the unlikely event that inner vessel 24 fails. Second, outer walls 26, 28 function essentially as a large capacity heat sink that helps maintain the temperature of inner vessel 24 within a safe, moderate range (preferably approximately 500°–600° C.) under all operating conditions.

Also, outer walls 26, 28 provide additional integral shielding around inner vessel 24 and strong, structural containment that can withstand fatigue, seismic and structural stresses, as well as thermal creep. Finally, outer walls 26, 28 generate low pressure steam from water in second annulus 74 (approximately 15–25 psig during normal operation) that can be recovered and used in processing the feed or vitrified product.

As shown in FIG. 1, in top region 32, central access nozzle 44 extends through top and floor shield plates 36, 38, first outer wall 26 and inner vessel 24 so that dry or slurry waste and glass formers can be gravity fed into inner vessel 24 through piping 84. Also, central access nozzle 44 allows off-gases to escape from inner vessel 24 during vitrification operations.

In bottom region 34, BPV assembly 46 drains molten vitrifiable material 48 from thermal region 54 of inner vessel 24. BPV assembly 46 preferably comprises a pour nozzle 86 surrounded by a water-cooled flange 88, preferably made of molybdenum or INCONEL alloy, and an induction heated coil 92. A replaceable ceramic, or water-cooled, flow-control orifice 94 is placed within the cylindrical opening of BPV assembly 46 to regulate the pour rate of the molten glass product from pour nozzle 86. Also, BPV assembly 46 has a fillport (not shown) for coupling BPV assembly 46 to a glass canister or mold (neither of which are shown) that is to be filled.

Water-cooled flange 88 and flow control orifice 94 provide primary glass shut-off by cooling glass flowing through pour nozzle 86, thus causing the otherwise molten glass to solidify inside pour nozzle 86. To restart the flow of the molten glass product from inner vessel 24, induction heated coil 92 is energized to heat the wall of metal pour nozzle 86 thereby melting the solidified glass in pour nozzle 86. In this manner, pour nozzle 86 can be cooled and heated to control the flow rate of the molten glass product so that it drains from pour nozzle 86 as desired.

BPV assembly 46 has a decoupling mechanism (shown as 96) to allow removal and installation of the entire BPV assembly 46 as a single piece following events such as the shutdown of melter 20. Preferably, decoupling mechanism 96 is remotely operated, thus allowing BPV assembly 46 to be removed and installed remotely or semi-remotely. Additionally, BPV assembly 46 can be equipped with a secondary stop valve and a water cooled slide valve (neither of which are shown) to provide auxiliary shut-off capability.

Referring to both FIGS. 1 and 2, skull 64 is preferably a thick, solidified layer of glass positioned along interior wall 62 of inner vessel 24. Preferably, skull 64 is formed to contain vitrifiable material 48 while simultaneously protecting interior wall 62 from vitrifiable material 48. Alternatively, a layer of sintered sand or refractory material may be applied between interior wall 62 of inner vessel 24 and the glass skull 64.

If cracks develop in skull 64 during operation of melter 20, the cracks will be filled in by vitrifiable material 48 upon heatup. Similarly, if the glass spalls (chips or splinters), the gap created in skull 64 will be filled with hot glass from vitrifiable material 48, which will later solidify. Therefore, in this sense, skull 64 is self-healing.

Electrodes 42, when energized and positioned within molten vitrifiable material 48, enable joule heating. Preferably, electrodes 42 are oriented vertically with respect to melter 20 and extend through top shield plate 36 and floor shield plate 38, as shown. Although only one pair of electrodes 42 is shown, a plurality of electrode sets can be used within inner vessel 24 during operation of melter 20, depending on the size of inner vessel 24 and the heating capacity required therein. For example, for a 25–50 ton per day (TPD) melter, inner vessel 24 will have approximately 2–3 sets of electrodes 42.

Electrodes 42 are adapted to be remotely retractable from top region 32 of melter 20. Preferably, electrodes 42 can be immersed 2 to 3 feet into the molten glass. However, the extent of the immersion of electrodes 42 depends on the waste feed and glass pour rates. To provide optimum voltage/amperage selection over a wide range of glass conductivities, elctrodes 42 can be positioned radially and tip to tip spacing adjusted while on-line.

Alternatively, each of electrodes 42 can have a hollow core (not shown) formed therein, so that, when electrodes 42 are positioned within vitrifiable material 48, vitrifiable material 48 can be sparged by circulating gas through the hollow core into the melt.

Preferably, electrodes 42 are dimensioned to have an outer diameter of approximately 6 to 8 inches (for a 25 TPD melter) and are made of INCONEL alloy, molybdenum, graphite, or a mixture thereof. However, other suitable materials can be used to make electrodes 42. The size of electrodes 42 preferably exceeds the size of ordinary horizontal electrodes known in the art. Thus, the gradual dissolution of electrodes made of molybdenum, especially by corrosive high $N_2O$ glass, has minimal effect on the larger electrodes 42. As a result, electrodes 42 do not have to be replaced as often as the smaller, horizontal electrodes.

Figure 3:
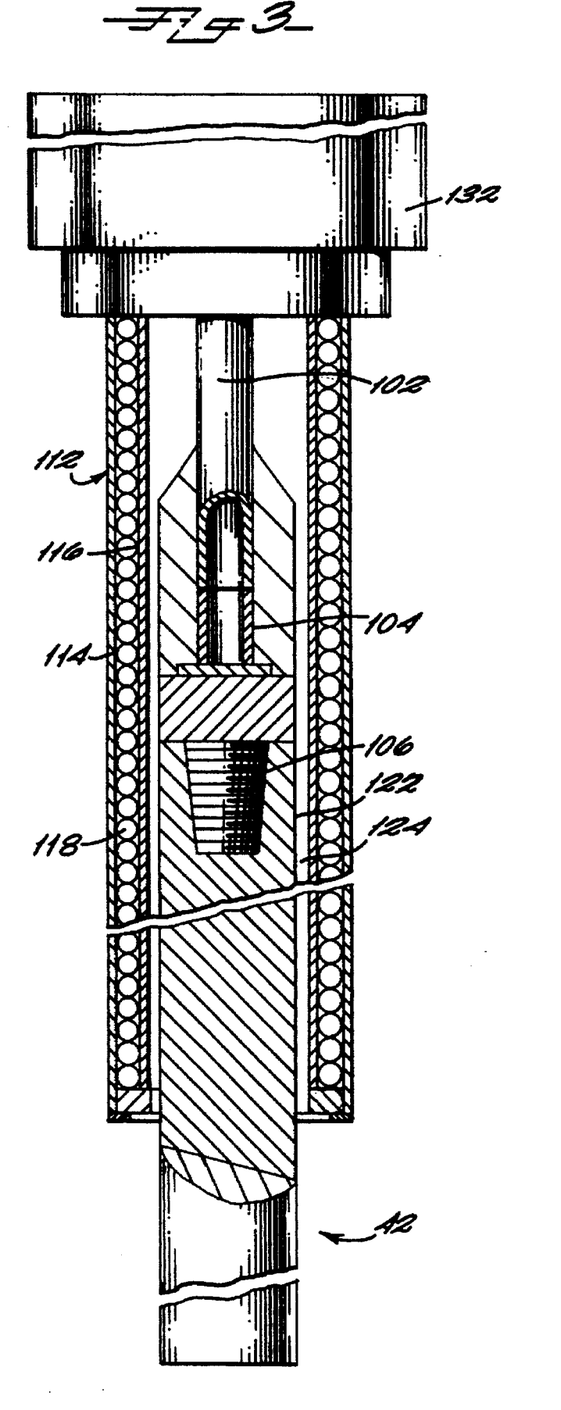
FIG. 3 is a partial, cross-sectional view of a vertical electrode as shown in FIG. 1.

As shown best in FIG. 3, each vertical electrode 42 has an electrically conductive cable 102 partially positioned therein. At the end 104 of cable 102 and within electrode 42, is an electrical adapter 106. The other end of cable 102 is in electrical connection with an electrical source (not shown).

Preferably, each electrode 42 is provided with a retractable/movable sleeve (shown as 112). Each sleeve is preferably made of a refractory metal, such as Inconel, but could also be made from a nonconductive ceramic, such as alumina or zirconia. Sleeves 112 protect electrodes 42 from oxidation in gas plenum 52. Preferably, each sleeve 112 has an outer protective surface 114, an inner insulative surface 116, and a plurality of spacer tubing 118 therebetween.

Each electrode 42 has an outer surface 122 spaced apart from inner insulative surface 116 of sleeve 112 to define a thin annulus 124. In operation, when electrodes 42 are operably positioned in vitrifiable material 48, a purge gas is preferably passed through annulus 124 to prevent corrosion of electrodes 42. Also, when both electrode 42 and its corresponding sleeve 112 are electrically conductive, the purge gas and insulative surface 116 minimizes electrical conduction between them.

Alternatively, thin annulus 124 can be used to gravity feed dry and liquid wastes into inner vessel 24, in a manner similar to that of piping 84 and central access nozzle 44. Also, alternatively, each sleeve 112 can be in fluid communication with a source of water and a pump (not shown) so that each sleeve 112 is water cooled by flowing water through spacer tubing 118.

Preferably, the upper portion (shown generally as housing 132) of each electrode 42 has a power feed clamp, an environmental seal housing with isolation valve, an insulative barrier, a retraction/insertion mechanism, a guide pipe or tube and rotary positioners to provide three dimensional adjustment of the electrodes_(none of which are shown). The retraction/insertion mechanism can be used to fully retract and replace electrodes 42, even during operation of melter 20.

The retraction of electrodes 42 may be independent of the movement of its corresponding sleeve 112, if desired. In the event of a total system failure of melter 20, in which case electrodes 42 cannot be retracted from inner vessel 24 and all of melter 20 must be disposed, an auxiliary induction coil (not shown) can remotely sever sleeves 112 and electrodes 42 from top region 32, if required.

In an alternative embodiment shown in FIG. 2, melter 20 is configured with a retractable oxygen lance 150, a side access nozzle 175, a dual zone bottom drain assembly 180, and at least one joule heated horizontal electrode 170 positioned within vitrifiable material 48.

In this configuration, retractable oxygen lance 150 is equipped with an inner tap pipe 152 and a water cooling sleeve 154. Oxygen is injected into inner tap pipe 152 through swivel seal 156, travels the length of pipe 152 and is introduced into gas plenum region 52 or into vitrifiable material 48 (as seen in FIG. 2). Inner pipe 152 is kept at a constant temperature by cooling sleeve 154. Water or other coolant is injected into sleeve 154 via inlet 158, circulates through sleeve 154, and is evacuated through outlet 160.

A drive motor 162 and a rotary seal 164 allow lance 150 to rotate about its vertical axis. When lance 150 is immersed in vitrifiable material 48 and rotated, mixing arms 166, extending radially from sleeve 154, stir vitrifiable material 48 and prevent channeling of the glass forming constituents, while the oxygen released by pipe 152 sparges the batch. When lance 150 is retracted into gas plenum region 52, lance 150 provides oxygen control for the top of the melt and can be used to combust organic materials within gas plenum 52.

Figure 5A:
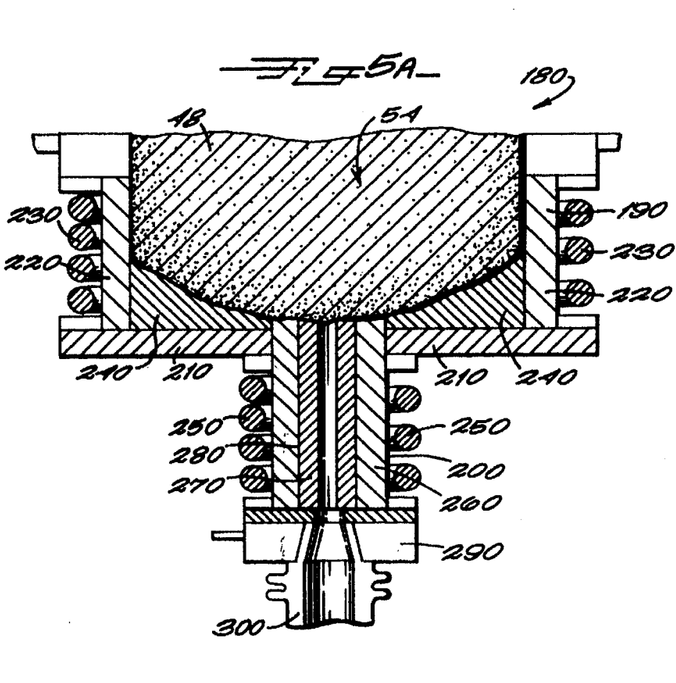
FIG. 5a is a partial, cross-sectional view of a dual zone bottom drain assembly shown in FIG. 2.

In lieu of BPV assembly 46, the embodiment illustrated in FIG. 2 has a dual melt zone bottom drain assembly 180 in bottom region 34. Drain assembly 180 depends from, and is in fluid communication with, melting/thermal region 54. Detailed in FIG. 5, assembly 180 is comprised of a melting region 190 and a nozzle 200. Melting region 190 has a floor 210, and induction heating coils 230 surrounding a wall 220. A metal layer 240 lines the interior of floor 210 and a portion of wall 220. Metal layer 240 can be any element or alloy which is relatively insoluble in vitrifiable material 48, resistant to oxidation, and has a melting point greater than the melting point of vitrifiable material 48.

Nozzle 200 has induction heating coils 250 surrounding a wall 260. The interior of wall 260 is fitted with a removable pipe 270, preferably made of a metal such as molybdenum or a ceramic such as silicon carbide, having an interior 280. Interior 280 of pipe 270 is in fluid communication with vitrifiable material 48 contained in melting region 190. Wall 260 of nozzle 200 protrudes above floor 210 of melting region 190 and abuts metal 240, thereby preventing metal 240, when in a molten state, from entering nozzle 200. The bottom 290 of nozzle 200 can be equipped with a water cooled valve/stopper 300.

In this embodiment, melter 20 is activated by energizing induction heating coils 250 contained in melting region 190. The heat generated from these coils 250 will radiate through wall 220 and melt metal 240 within the interior of region 190. As metal 240 melts, heat will be transferred from molten metal 240 to the adjacent vitrifiable material 48. As vitrifiable material 48 melts, sufficient heat is generated in melting/thermal region 54 to activate joule heated horizontal electrode(s) 170.

Vitrifiable material 48 is prevented from draining from melter 20 when induction heating coils 250 located in nozzle 200 are deactivated. Any molten vitrifiable material 48 that enters interior 280 of nozzle 200 is solidified therein due to the low temperature. This solidified material 48 acts as a barrier, and seals the flow of material 48 through nozzle 200. In the unlikely event that vitrifiable material 48 does not solidify in nozzle 200, water/cooled valve stopper 300 can be closed to prevent vitrifiable material 48 from exiting melter 20.

When induction heating coils 250 are activated, heat is transferred to pipe 270, which in turn causes vitrifiable material 48 within interior 280 to melt. Thereafter, the melted vitrifiable material 48 within melting region 190 will flow through interior 280 of nozzle 200. This flow will continue until induction heating coils 250 are deactivated.

Figure 5B:
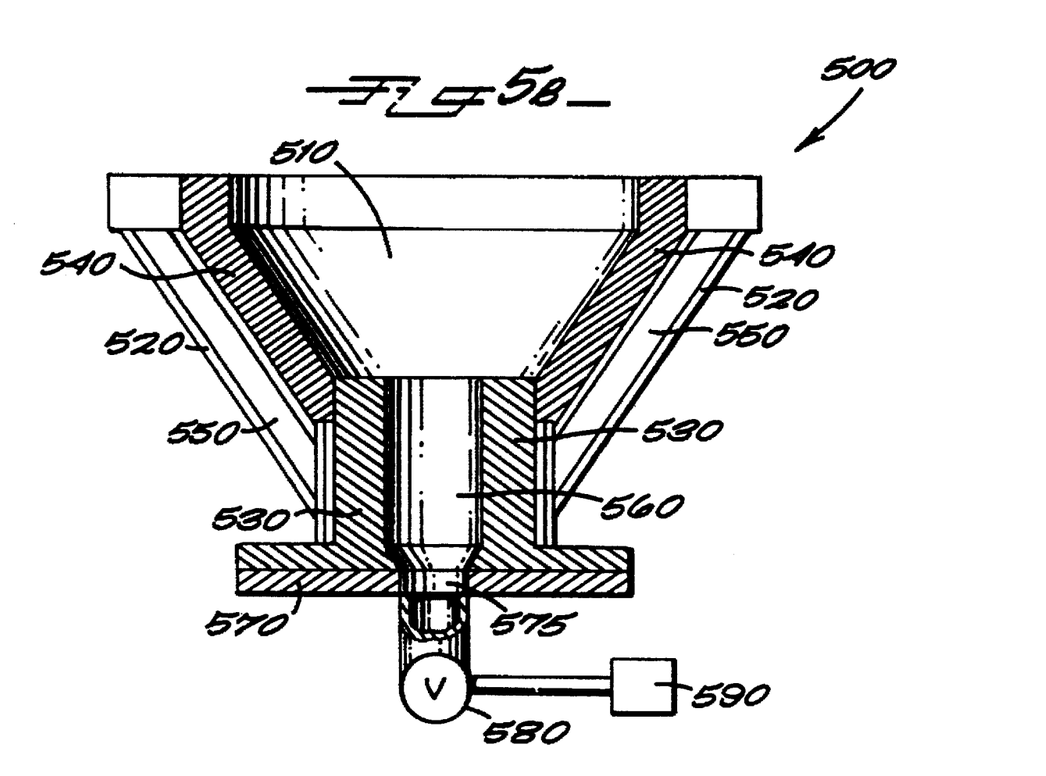
FIG. 5b is a partial, cross-sectional view of a bottom electrode drain assembly, according to another alternative of the present invention.

The bottom electrode drain assembly 500, detailed in FIG. 5b, can be substituted for dual melt zone bottom drain assembly 180. Bottom electrode drain assembly 500 is comprised of an inner vessel 510 and an outer wall 520 with an annulus 550 existing therebetween. A bottom electrode 530 resides at the bottom of drain assembly 500 and provides an inner diameter 560 through which vitrifiable material exits inner vessel 510. The inner wall of inner vessel 510 is coated with a skull 540. Preferably skull 540 is composed of the same material as vitrifiable material 48, so as to avoid contamination. A coolant fluid may be introduced into annulus 550, thereby maintaining a certain temperature within inner vessel 510. Bottom electrode 530 is equipped with a flow orifice stopper plate 570. Flow orifice stopper plate 570 contains an aperature 575 which restricts the flow of vitrifiable material 48 from drain 500. In mating engagement with flow orifice stopper plate is a water or gas cooled valve 580, which provides additional flow control. Control of valve 580 is achieved by a mechanical control device 590.

Bottom electrode 530 directs heat at the point of discharge, thereby providing precise flow control. When activated, bottom electrode 530 allows vitrifiable material 48 to exit inner vessel 510. Deactivation causes vitrifiable material 48 within inner diameter 560 to solidify, resulting in the creation of an effective barrier, prohibiting the flow of vitrifiable material 48 from inner vessel 510. In another alternative embodiment shown in FIG. 4, melter 20 is configured essentially the same as shown in FIG. 1, except for a water/steam jacket 134, defined by annulus 74 formed by first outer wall 26 and inner vessel 24. Thus, there is no dry annulus.

Figure 4:
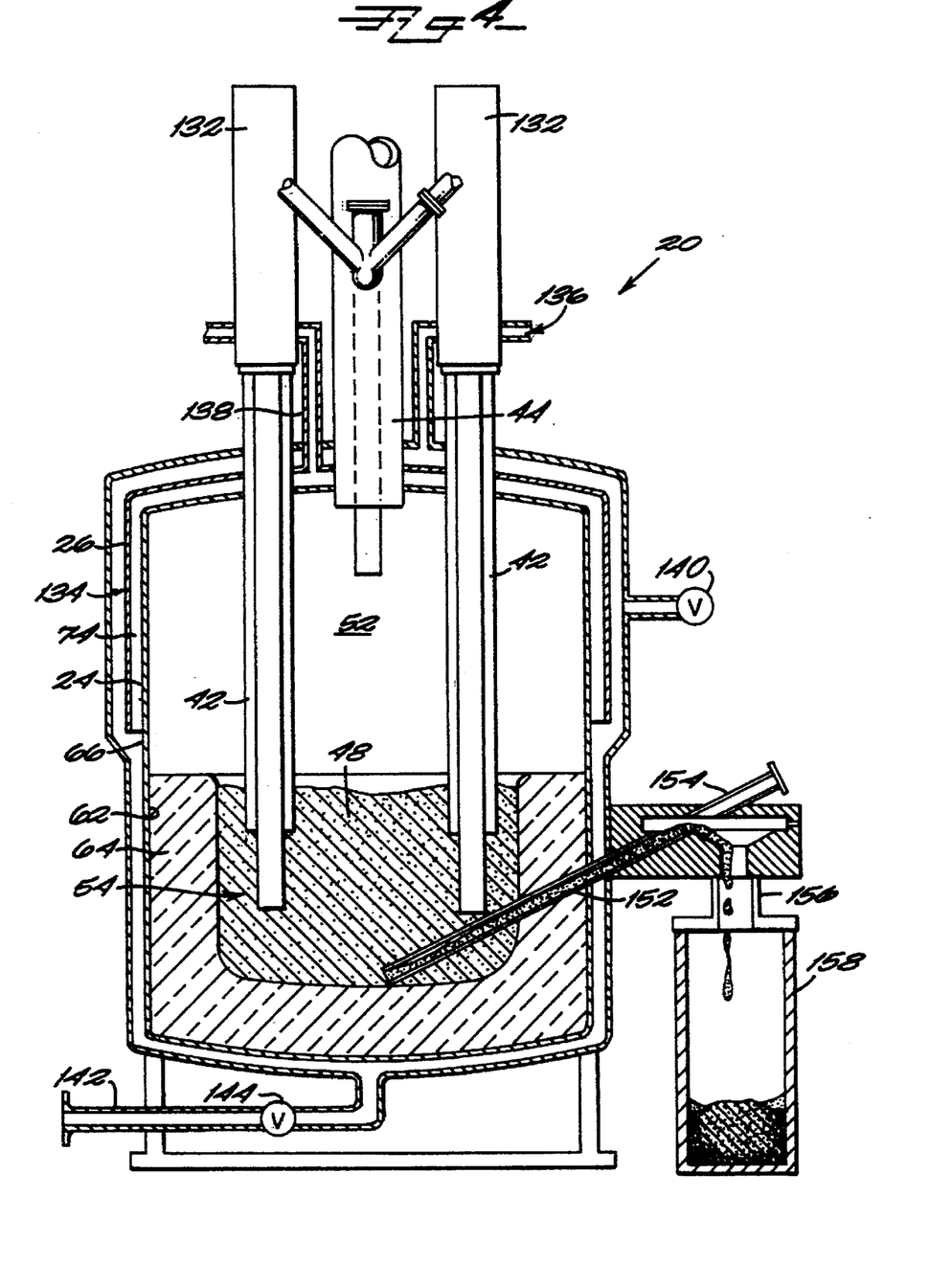
FIG. 4 is a partial, cross-sectional view of a melter according to another alternative embodiment of the present invention.

In this configuration, exterior 66 of inner vessel 24 is cooled directly by circulating fluid through water/steam jacket 134. Fluid enters water/steam jacket 134 through inlet piping 136, which is connected to a pump (not shown) in the normal manner.

The cooling fluid circulates through water/steam jacket 134 at a temperature and pressure that causes some steam to be generated as heat is transferred from exterior 66 of inner vessel 24 to the circulating fluid. The steam, which normally exits water/steam jacket 134 at approximately 15–25 psig, is removed from water/steam jacket 134 via outlet piping 138. Preferably, outlet piping 138 directs the steam to another part of the overall process of vitrification that can make use of the steam, thus reducing the overall energy losses and increasing the overall energy efficiency of the system. Also, a pressure relief valve 140 is operably connected to water/steam jacket 134.

In this configuration, the lower portion of water/steam jacket 134 has a blow down ring 142 formed therein. Blow down ring 142 is used to prevent accumulation of deposits as steam is generated in water/steam jacket 134. Also, a pressure release valve 144 is operably connected to blow down ring 142.

Vitrifiable material 48 is removed from inner vessel 24 using a lift box 152 having vacuum or gas lift means (not shown). In this configuration, there is no BPV assembly as is shown in FIGS. 1. Lift box 152 has a fillhead adapter 156 that is preferably coupled to a canister 158 to be filled with the molten vitrifiable material 48. In operation, the vacuum, or gas lift means removes the desired amount of vitrifiable material 48 at the desired rate and in a manner that allows the canister 158 to be filled with vitrifiable material 48.

Figure 6:
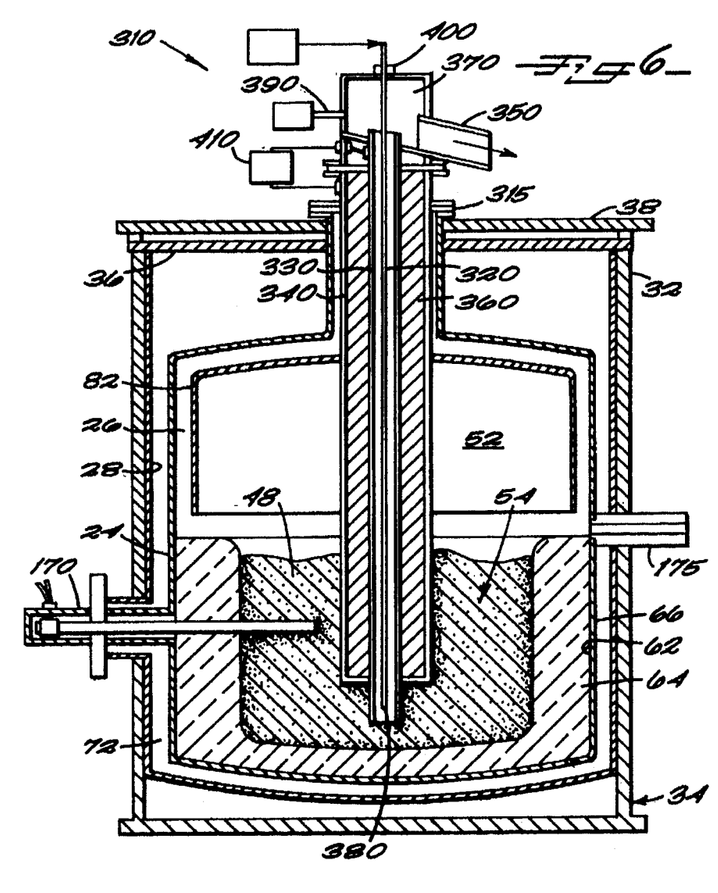
FIG. 6 is a partial, cross-sectional view of a melter according to another alternative embodiment of the present invention.

Still another embodiment of the present invention is shown in FIG. 6. In this configuration, vitrifiable material 48 is removed from melter 20 by a top entry glass tap 310. Glass tap 310 depends from top region 32 into melting/thermal region 54 and operates to remove melted vitrifiable material 48 from melter 20.

Glass tap 310 comprises a gas injection tube 320, a tap pipe 330 and an outer sleeve 340. Insulative disc 315 sealingly engages glass tap 310 to plate 38. A seal 400 attaches gas injection tube 320 to glass tap 310 and prevents the external atmosphere from reducing the vacuum produced by vacuum means 390 (discussed below).

Vacuum means 390 draws vitrifiable material 48 from melting/thermal region 54 into tap pipe 330. Vitrifiable material 48, while being transported through tap pipe 330, is injected with gas from gas injection tube 320, thereby increasing the flow rate of vitrifiable material 48 through tap pipe 330. The end 380 of gas injection tube 330 is recessed within tap pipe 330 to prevent gas from entering vitrifiable material 48 contained in melting/thermal region 54. In order to maintain the temperature of tap pipe 330, refractory insulation 360 is contained within outer sleeve 340 and surrounds the exterior of tap pipe 330. Furthermore, a power supply 410 supplies energy enabling glass tap 310 to be heated. This heat can be in the form of inductive, resistance, or impedance heating.

The gas and vitrifiable material 48 are transported to a gas separator 370, wherein the gas is separated from the vitrifiable material 48 and evacuated through an off-gas vent. Vacuum means 390 draws vitrifiable material 48 from glass tap 310 through glass nozzle 350 for further processing (not shown).

Melter 20 is operated at a slightly negative pressure so that there is little or no leak of possible radioactive material from inner vessel 24. However, all joints of melter 20 are preferably welded so that melter is essentially leak-free. Furthermore, central access nozzle 44 and electrodes 42 penetrate melter 20 in a manner that provides a completely leak-tight unit that can be operated with positive pressure, if desired.

The operating procedures for melter 20 are similar, if not identical, to other joule-heated melters with the power supply (not shown) providing controls for both voltage and amperage variation. Preferably, melter 20 operates continuously and maintains the temperature of vitrifiable material 48 in the range of approximately 1050°–1500° C.

The initial startup of melter 20 or startup from a cold shutdown is accomplished by introducing, via central access nozzle 44 (FIG. 1) or side access nozzle 175 (FIG. 2 and 6), a conductive powder mixture on top of the powder fill of the cold glass contained in inner vessel 24 at this time. The melter power supply (not shown) is set to approximately 200–400 volts and current begins to flow through the electrically conductive powder so that sufficient joule heat is generated to melt the top layer of glass or powder.

The voltage is gradually reduced as a layer of electrically conductive molten glass develops and deepens. One or more mechanical stirrers (not shown) may be used within inner vessel 24 to improve the consistency of vitrifiable material 48 as it is melting. The startup is complete when vitrifiable material 48 at bottom region 34 of inner vessel 24 is sufficiently fluid to flow out of BPV assembly 46, dual melt zone bottom drain assembly 180, or bottom electrode drain assembly 500.

Because melter 20 uses no refractories, the startup and shutdown operations just described can be repeated more rapidly than ordinary joule heated melters, which use refractories that can be damaged by thermal shock. Also, melter 20 has no need for an auxiliary burner or a high maintenance electrical resistance heater, both of which are used to assist in the startup of ordinary joule-heated melters.

If desired, a thin layer (approximately 1–4 inches) of startup refractory may be installed in melter 20. If so, during initial startup, reciter 20 will have approximately 1% by weight of iron or other suitable infrared absorber added to vitrifiable material 48 to preclude any radiative heat transport from vitrifiable material 48 through skull 64 to interior wall 62 of inner vessel 24. In this manner, heat transfer is limited to convection and conduction.

If melter 20 is being used for vitrification of radioactive materials, it is possible, upon completion of the melting application, to significantly decrease radiation levels inside inner vessel 24. To do so, the waste loading in vitrifiable material 48 is decreased and its temperature is increased to approximately 1500° C. or higher so that a portion of skull 64 melts. Then, vitrifiable material 48 is drained from inner vessel 24, leaving most of the clean, non-radioactive skull 64 in place.

It will be apparent to those skilled in the art that many changes and substitutions can be made to the preferred embodiment herein described without departing from the spirit and scope of the present invention as defined by the appended claims.

What is claimed is:

1. Apparatus for melting vitrifiable material, said apparatus comprising:
    an inner vessel, said inner vessel having a solidified coating of vitrifiable material on its inner surface;
    a first wall spaced apart from said inner vessel so as to define a first annulus therebetween;
    a second wall spaced apart from said first wall so as to define a second annulus therebetween;
    means within said inner vessel for heating vitrifiable material in said inner vessel;
    means for introducing a coolant fluid into said first annulus; and
    means for circulating coolant through said second annulus.

2. The apparatus as recited in claim 1, wherein said first and said second walls are connected so as to form a seal so that said second annulus can be pressurized, said coolant evaporating when said heating means heats said vitrifiable material.

3. The apparatus as recited in claim 1, wherein said heating means further comprises at least one electrode and said inner vessel carries a non-electrically conducting coating on its inner surface.

4. The apparatus as recited in claim 1, wherein said heating means further comprises:
    at least one electrode;
    said electrode having a spaced apart outer surface; said electrode and said outer surface defining an opening therebetween; and
    means for injecting a gas through said opening into said vitrifiable material.

5. The apparatus as recited in claim 1, wherein said heating means further comprises at least one vertical electrode, said vertical electrode having an outer surface and a sleeve, said sleeve covering said outer surface, said sleeve made of a material chosen from the group consisting essentially of refractory metal, alumina and zirconia.

6. The apparatus as recited in claim 1, wherein said heating means further comprises at least one vertical electrode, said vertical electrode having an outer surface spaced apart from a sleeve so as to define an opening therebetween and insulative material, said insulative material positioned in said opening, said sleeve made of a material chosen from the group consisting essentially of refractory metal, alumina and zirconia.

7. The apparatus as recited in claim 1, wherein said heating means further comprises at least one vertical electrode, said vertical electrode having an outer surface spaced apart from a sleeve so as to define an opening therebetween and a coolant fluid, said coolant fluid circulated through said opening, said sleeve made of a material chosen from the group consisting essentially of refractory metal, alumina and zirconia.

8. The apparatus as recited in claim 1, wherein said heating means further comprises at least one vertical electrode, said vertical electrode having an outer surface spaced apart from a sleeve so as to define an opening therebetween and insulative material, said insulative material positioned in said opening, said sleeve made of a material chosen from the group consisting essentially of refractory metal, alumina and zirconia, said at least one electrode being laterally movable, said at least one electrode being retractable.

9. The apparatus as recited in claim 1, wherein said heating means further comprises at least one vertical electrode, said vertical electrode having an outer surface spaced apart from a sleeve so as to define an opening therebetween and a coolant fluid, said coolant fluid circulated through said opening, said sleeve made of a material chosen from the group consisting essentially of refractory metal, alumina and zirconia, said at least one electrode being laterally movable, said at least one electrode being retractable.

10. The apparatus as recited in claim 1, wherein said inner vessel has a top and a bottom, and said inner vessel further comprises
    a drain located at said bottom of said vessel; and
    means for heating said drain.

11. The apparatus as recited in claim 1, further comprising means in fluid communication with said first annulus for detecting leaks of said vitrifiable material in said first annulus.

12. Apparatus for melting vitrifiable material, said apparatus comprising:
    an inner vessel dimensioned to hold a charge of said vitrifiable material, said inner vessel having an inner surface, an interior, a top, a bottom, and a gas plenum region positioned above said vitrifiable material;
    a wall spaced apart from said inner vessel so as to define an annulus therebetween;
    means for introducing an inert gas into said annulus;
    means within said inner vessel for heating by electrical induction said vitrifiable material when said vitrifiable material is fed into said inner vessel;
    means within said inner vessel for absorbing heat radiactively transferred by said vitrifiable material when said vitrifiable material is heated by said heating means;
    a water jacket surrounding said wall;
    means for circulating water through said water jacket; and
    a coating of non-electrically conducting material carried on said inner surface of said vessel.

13. The apparatus as recited in claim 12, wherein said heating means further comprises:
   at least one electrode;
   said electrode having a spaced apart outer surface, said electrode and said outer surface defining an opening therebetween; and
   means for injecting a gas through said opening into said vitrifiable material.

14. The apparatus as recited in claim 12, further comprising means for injecting said vitrifiable material with a gas, said injecting means comprising:
   a source of gas; and
   a retractable vertical pipe having a first end and a second end, said first end of said vertical pipe immersed in said vitrifiable material, said vertical pipe transporting said gas from said source to said vitrifiable material.

15. The apparatus as recited in claim 12, further comprising means for injecting said vitrifiable material with a gas, said injecting means comprising:
   a source of gas;
   a retractable vertical pipe having a first end and a second end, said first end of said vertical pipe immersed in said vitrifiable material, said vertical pipe having an outer surface spaced apart from a sleeve so as to define an opening therebetween, said vertical pipe transporting said gas from said source to said vitrifiable material; and
   means for circulating a coolant through said opening.

16. The apparatus as recited in claim 12, further comprising means for injecting said vitrifiable material with a gas, said injecting means comprising:
   a source of gas;
   a retractable vertical pipe having a first end and a second end, said vertical pipe being rotatable about its vertical axis, said first end of said vertical pipe immersed in said vitrifiable material, said vertical pipe having an outer surface spaced apart from a sleeve so as to define an opening therebetween, said vertical pipe transporting said gas from said source to said vitrifiable material;
   means for circulating a coolant through said opening; and
   a plurality of mixing blades, said mixing blades extending radially from said sleeve, said mixing blades stirring said vitrifiable material when said vertical pipe is rotated.

17. The apparatus as recited in claim 12, wherein said coating is approximately four to eight inches thick.

18. The apparatus as recited in claim 12, wherein said coating is made of vitrifiable material.

19. The apparatus as recited in claim 12, wherein said inner vessel and said first wall meet to form a seal so that said annulus can be pressurized, said water evaporating when said heating means heats said vitrifiable material.

20. The apparatus as recited in claim 12, wherein said heating means is at least one electrode.

21. The apparatus as recited in claim 12, wherein said absorbing means further comprise a shield, said shield positioned in said gas plenum region of said inner vessel, said shield having a bridge member joining two spaced apart plates, said bridge member being parallel to said top of said inner vessel, said two spaced apart plates depending from said bridge member towards said vitrifiable material.

22. The apparatus as recited in claim 12, further comprising at least one retractable mixing blade, said mixing blade immersed in said vitrifiable material, said mixing blade mixing said vitrifiable material.

* * * * *